(12) United States Patent
Lee et al.

(10) Patent No.: US 10,052,611 B2
(45) Date of Patent: Aug. 21, 2018

(54) METHOD OF PREPARING SUPERABSORBENT POLYMER

(71) Applicant: LG Chem, Ltd., Seoul (KR)

(72) Inventors: Seung Mo Lee, Daejeon (KR); Gi Cheul Kim, Daejeon (KR); Sang Gi Lee, Daejeon (KR); Kum Hyoung Lee, Daejeon (KR); Se Yeol Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/517,341

(22) PCT Filed: Dec. 10, 2015

(86) PCT No.: PCT/KR2015/013528
§ 371 (c)(1),
(2) Date: Apr. 6, 2017

(87) PCT Pub. No.: WO2016/093643
PCT Pub. Date: Jun. 16, 2016

(65) Prior Publication Data
US 2017/0297002 A1    Oct. 19, 2017

(30) Foreign Application Priority Data
Dec. 10, 2014  (KR) .................. 10-2014-0177499

(51) Int. Cl.
| | | |
|---|---|---|
| *B01J 20/26* | (2006.01) | |
| *B01J 20/30* | (2006.01) | |
| *C08J 3/12* | (2006.01) | |
| *C08J 3/24* | (2006.01) | |
| *C08F 120/06* | (2006.01) | |

(52) U.S. Cl.
CPC .......... *B01J 20/261* (2013.01); *B01J 20/267* (2013.01); *B01J 20/3021* (2013.01); *B01J 20/3085* (2013.01); *C08F 120/06* (2013.01); *C08J 3/12* (2013.01); *C08J 3/245* (2013.01); *C08J 2333/02* (2013.01)

(58) Field of Classification Search
None
See application file for complete search history.

(56) References Cited

U.S. PATENT DOCUMENTS

| | | | |
|---|---|---|---|
| 4,446,261 A | 5/1984 | Yamasaki et al. | |
| 6,914,099 B2 | 7/2005 | Kim | |
| 7,816,426 B2 * | 10/2010 | Ahmed | A61L 15/56 523/200 |
| 2005/0222374 A1 | 10/2005 | Muller et al. | |
| 2006/0073969 A1 | 4/2006 | Torii et al. | |
| 2006/0089611 A1 * | 4/2006 | Herfert | A61L 15/42 604/367 |
| 2006/0252899 A1 | 11/2006 | Himori et al. | |
| 2006/0252923 A1 | 11/2006 | Olejnik et al. | |
| 2010/0286287 A1 | 11/2010 | Walden | |
| 2011/0118114 A1 | 5/2011 | Riegel et al. | |
| 2011/0118430 A1 | 5/2011 | Funk et al. | |
| 2013/0256593 A1 * | 10/2013 | Herfert | B01J 20/267 252/194 |
| 2013/0260988 A1 * | 10/2013 | Herfert | B01J 20/223 502/402 |
| 2014/0158626 A1 * | 6/2014 | Ziemer | A61L 15/425 210/660 |
| 2015/0065594 A1 * | 3/2015 | Wendker | C08F 220/06 521/113 |
| 2015/0259522 A1 | 9/2015 | Lee et al. | |

FOREIGN PATENT DOCUMENTS

| | | |
|---|---|---|
| EP | 0505163 A1 | 9/1992 |
| JP | S56161408 A | 12/1981 |
| JP | S57158209 A | 9/1982 |
| JP | S57198714 A | 12/1982 |
| JP | H04106108 A | 4/1992 |
| JP | 2613934 B2 | 5/1997 |
| JP | 2902201 B2 | 6/1999 |
| JP | 2005226042 A | 8/2005 |
| JP | 2005240151 A | 9/2005 |
| JP | 2006521431 A | 9/2006 |
| JP | 2006299234 A | 11/2006 |
| JP | 4422509 B2 | 2/2010 |
| JP | 5377642 B2 | 12/2013 |

(Continued)

OTHER PUBLICATIONS

Third Party Observation for PCT/KR2015/013528 dated Apr. 7, 2017.
International Search Report for PCT/KR2015/013528 dated Jun. 3, 2016.
Odian, Principle of Polymerization, Second Edition, (Wiley, 1981), p. 203.
Schwalm, UV Coatings: Basics, Recent Developments and New Application, Elsevier 2007, p. 115.
Extended European Search Report for Application No. EP15867386.3 dated Dec. 4, 2017.

*Primary Examiner* — Vu A Nguyen
(74) *Attorney, Agent, or Firm* — Lerner, David, Littenberg, Krumholz & Mentlik, LLP

(57) ABSTRACT

Provided is a method of preparing a superabsorbent polymer. In the method of preparing the superabsorbent polymer according to the present disclosure, a polymer resulting from polymerization of ethylene-based unsaturated monomers is subjected to a reassembling process by mixing with a compound of a particular Chemical Formula and water. According to the preparation method of the present disclosure, provided is a method of preparing a superabsorbent polymer having improved water holding capacity and a reduced content of residual monomers, thereby improving quality of final polymer products.

10 Claims, No Drawings

(56) References Cited

FOREIGN PATENT DOCUMENTS

| KR | 20140036866 A | 3/2014 |
|---|---|---|
| KR | 20140063457 A | 5/2014 |
| WO | 2009011717 A1 | 1/2009 |

* cited by examiner

METHOD OF PREPARING SUPERABSORBENT POLYMER

CROSS-REFERENCE TO RELATED APPLICATIONS

This application is a national phase entry under 35 U.S.C. § 371 of International Application No. PCT/KR2015/013528, filed Dec. 10, 2015, which claims priority to Korean Patent Application No. 10-2014-0177499, filed Dec. 10, 2014, the disclosures of which are incorporated herein by reference.

BACKGROUND OF THE INVENTION

(a) Field of the Invention

The present disclosure relates to a method of preparing a superabsorbent polymer. More particularly, the present disclosure relates to a method of preparing a superabsorbent polymer having improved water holding capacity and a reduced content of residual monomers.

(b) Description of the Related Art

A superabsorbent polymer (SAP) is a synthetic polymeric material capable of absorbing moisture from about 500 to 1000 times its own weight. Various manufacturers have denominated it as different names, such as SAM (Super Absorbency Material), AGM (Absorbent Gel Material), etc. Since such superabsorbent polymers started to be practically applied in sanitary products, now they have been widely used not only for hygiene products such as disposable diapers for children, etc., but also for water retaining soil products for gardening, water stop materials for the civil engineering and construction, sheets for raising seedling, fresh-keeping agents for food distribution fields, materials for poultice, etc.

As a preparation process for such superabsorbent polymers, a process by a reverse phase suspension polymerization and a process by a solution polymerization have been known. For example, Japanese Patent Laid-open Publication Nos. S56-161408, S57-158209, and S57-198714 disclose the reverse phase suspension polymerization. The process by the solution polymerization further includes a thermal polymerization method in which a polymerization gel is polymerized while being broken and cooled in a kneader equipped with a plurality of shafts, and a photo-polymerization method in which an aqueous solution with a high concentration is irradiated with UV rays on a belt to be polymerized and dried at the same time.

The water-containing gel polymers thus obtained through the polymerization reaction are generally marketed in a powdery form after drying and pulverization processes.

In this regard, the fine powders (fines) having a particle size of about 150 μm or less may be generated during cutting, pulverizing, and milling processes of the dried polymer. Application of the superabsorbent polymer particles including the fine powders to hygiene goods such as a baby diapers and an adult urinary incontinence device is considered undesirable, because it may be moved before being used or may show decreased properties.

Therefore, a process of excluding the fine powders so that the fine powders are not included in a final polymer product, or a reassembling process of aggregating the fine powders to a normal particle size is carried out. In this regard, a high aggregation strength is important in order to prevent rebreaking of the aggregates into the fine powders after the reassembling process. The reassembling process is generally carried out under a wet condition to increase the aggregation strength. In this regard, as the water content of the fine powders is higher, the aggregation strength of the fine powders increases, but it is not easy to handle the fine powders in the reassembling process. As the water content of the fine powders is lower, the reassembling process becomes easier, but the aggregation strength becomes lower and the aggregates may be easily rebroken into the fine powders after the reassembling process.

Further, it is difficult to expect improvement in physical properties, such as content of residual monomers or water holding capacity, by performing the reassembling process using only water.

SUMMARY OF THE INVENTION

In order to solve the above problems of the prior art, the present disclosure is intended to provide a method of preparing a superabsorbent polymer having high aggregation strength of fine powders and improved water holding capacity and also having a reduced content of residual monomers, thereby improving quality of a final polymer product.

In order to achieve the above object, the present disclosure provides a method of preparing a superabsorbent polymer, the method including:

preparing a reassembled polymer by reassembling a mixture of a polymer resulting from polymerization of ethylene-based unsaturated monomers, a compound represented by the following Chemical Formula 1, and water;

drying the reassembled polymer; and pulverizing the dried reassembled polymer:

[Chemical Formula 1]

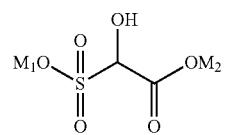

wherein $M_1$ and $M_2$ are the same as or different from each other, and each independently a monovalent cation.

According to the method of preparing the superabsorbent polymer of the present disclosure, it is possible to prepare a superabsorbent polymer having high aggregation strength of fine powders and improved water holding capacity and also having a reduced content of residual monomers by the easy reassembling process.

DETAILED DESCRIPTION OF THE EMBODIMENTS

A method of preparing a superabsorbent polymer of the present disclosure includes preparing a reassembled polymer by reassembling a mixture of a polymer resulting from polymerization of ethylene-based unsaturated monomers, a compound represented by the following Chemical Formula 1, and water; drying the reassembled polymer; and pulverizing the dried reassembled polymer:

[Chemical Formula 1]

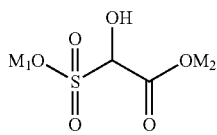

wherein $M_1$ and $M_2$ are the same as or different from each other, and each independently a monovalent cation.

Hereinafter, a method of preparing a superabsorbent polymer according to an embodiment of the present disclosure will be described in detail.

In the method of preparing the superabsorbent polymer of the present disclosure, a water-containing gel polymer is first prepared by carrying out thermal polymerization or photo-polymerization of a monomer composition including the water-soluble ethylene-based unsaturated monomers and a polymerization initiator.

The term "polymer resulting from polymerization of ethylene-based unsaturated monomers", as used herein, includes all of a polymer obtained by drying the water-containing gel polymer, a polymer obtained by pulverizing the water-containing gel polymer or the dried polymer, a polymer before performing a surface crosslinking reaction, and a polymer after performing the surface crosslinking reaction according to a general method of preparing the superabsorbent polymer, as well as the water-containing gel polymer formed immediately after thermal polymerization or photo polymerization of the monomer composition. As long as the polymer is a polymer resulting from polymerization of ethylene-based unsaturated monomers, there is no limitation in its shape, water content, particle size, surface crosslinking, etc.

Meanwhile, according to an embodiment of the present disclosure, the preparation method of the present disclosure may be usefully applied to, particularly, a polymer having a low particle size needed to be reassembled, among polymers produced during a series of processes of preparing the superabsorbent polymer such as polymerizing, drying, pulverizing, surface crosslinking, etc., described below.

First, the monomer composition which is a raw material of the superabsorbent polymer includes the water-soluble ethylene-based unsaturated monomer and the polymerization initiator.

As the water-soluble ethylene-based unsaturated monomer, any monomer may be used without limitation, as long as it is commonly used in the preparation of the superabsorbent polymer. Herein, any one or more monomers selected from the group consisting of an anionic monomer and salts thereof, a nonionic hydrophilic monomer, an amino group-containing unsaturated monomer, and a quaternary compound thereof may be used.

Specifically, any one or more selected from the group consisting of an anionic monomer such as (meth)acrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and salts thereof; a nonionic hydrophilic monomer such as (meth)acrylamide, N-substituted (meth)acrylate, 2-hydroxyethyl(meth)acrylate, 2-hydroxypropyl(meth)acrylate, methoxy polyethylene glycol (meth)acrylate, or polyethylene glycol (meth)acrylate; and an amino group-containing unsaturated monomer such as (N,N)-dimethylaminoethyl (meth)acrylate or (N,N)-dimethylaminopropyl(meth)acrylamide, and a quaternary compound thereof may be used.

More preferably, acrylic acid or salts thereof, for example, acrylic acid or alkali metal salts such as sodium salts thereof may be used. When these monomers are used, it is possible to prepare a superabsorbent polymer having superior physical properties. When the alkali metal salt of acrylic acid is used as the monomer, acrylic acid may be used after being neutralized with a basic compound such as caustic soda (NaOH).

A concentration of the water-soluble ethylene-based unsaturated monomer may be about 20% by weight to about 60% by weight, preferably about 40% by weight to about 50% by weight, based on the monomer composition including the raw materials of the superabsorbent polymer and a solvent, and the concentration may be properly controlled, considering a polymerization time and reaction conditions. However, if the monomer concentration is too low, the yield of the superabsorbent polymer may become low and an economic problem may occur. On the contrary, if the concentration is too high, there is a process problem that part of the monomers is precipitated, or pulverization efficiency is lowered upon pulverization of the polymerized water-containing gel polymer, and the physical properties of the superabsorbent polymer may be reduced.

In the method of preparing the superabsorbent polymer of the present disclosure, the polymerization initiator used in polymerization is not particularly limited, as long as it is generally used in the preparation of the superabsorbent polymer.

Specifically, the polymerization initiator may be a thermal polymerization initiator or a photo-polymerization initiator by UV irradiation, depending on a polymerization method. However, even though the photo-polymerization is performed, a certain amount of heat may be generated by UV irradiation, etc., and also generated with exothermic polymerization reaction. Therefore, the thermal polymerization initiator may be further included.

As the photo-polymerization initiator, a compound capable of forming radicals by a light such as UV may be used without limitations in the constitution.

As the photo-polymerization initiator, for example, one or more selected from the group consisting of benzoin ether, dialkyl acetophenone, hydroxyl alkylketone, phenyl glyoxylate, benzyl dimethyl ketal, acyl phosphine, and α-aminoketone may be used. Meanwhile, as the specific example of acyl phosphine, commercial Lucirin TPO, namely, 2,4,6-trimethyl-benzoyl-trimethyl phosphine oxide may be used. More various photo-polymerization initiators are well disclosed in "UV Coatings: Basics, Recent Developments and New Application (Elsevier, 2007)" written by Reinhold Schwalm, p 115, however, they are not limited to the above described examples.

The concentration of the photo-polymerization initiator may be about 0.01% by weight to about 1.0% by weight, based on the total weight of the monomer composition. If the concentration of the photo-polymerization initiator is too low, the polymerization rate may become low. If the concentration of the photo-polymerization initiator is too high, the molecular weight of the superabsorbent polymer may become low and its physical properties may not be uniform.

Further, as the thermal polymerization initiator, one or more selected from the group consisting of persulfate-based initiators, azo-based initiators, hydrogen peroxide, and ascorbic acid may be used. Specific examples of the persulfate-based initiators may include sodium persulfate ($Na_2S_2O_8$), potassium persulfate ($K_2S_2O_8$), ammonium persulfate (($NH_4$)$_2$$S_2$$O_8$), etc. Examples of the azo-based initiators may include 2,2-azobis(2-amidinopropane)dihydrochloride, 2,2-azobis-(N,N-dimethylene)isobutyramidine dihydrochloride, 2-(carbamoylazo)isobutylonitril, 2,2-azobis(2-[2-imidazolin-2-yl]propane)dihydrochloride, 4,4-azobis-(4-cyanovaleric acid), etc. More various thermal polymerization initiators are well-disclosed in 'Principle of Polymerization (Wiley, 1981)' written by Odian, p 203, however, they are not limited to the above described examples.

The concentration of the thermal polymerization initiator may be about 0.001% by weight to about 0.5% by weight, based on the total weight of the monomer composition. If the concentration of the thermal polymerization initiator is too low, additional thermal polymerization hardly occurs, and thus the addition effect of the thermal polymerization initiator may not be sufficient. If the concentration of the thermal polymerization initiator is too high, the molecular weight of the superabsorbent polymer may become low and its physical properties may not be uniform.

According to an embodiment of the present disclosure, the monomer composition may further an internal crosslinking agent as a raw material of the superabsorbent polymer. The internal crosslinking agent may be a crosslinking agent having one or more ethylene-based unsaturated groups in addition to the functional group which may react with the water-soluble substituents of the water-soluble ethylene-based unsaturated monomer; or a crosslinking agent having two or more functional groups which may react with the water-soluble substituents of the monomer and/or the water-soluble substituents formed by hydrolysis of the monomer.

As the specific example of the internal crosslinking agent, a C8-C12 bisacrylamide, bismethacrylamide, a poly(meth)acrylate of C2-C10 polyol, or a poly(meth)allylether of C2-C10 polyol, etc. may be used, and more specifically, one or more agents selected from the group consisting of N,N'-methylenebis(meth)acrylate, ethyleneoxy(meth)acrylate, polyethyleneoxy(meth)acrylate, propyleneoxy(meth)acrylate, glycerin diaciylate, glycerin triacrylate, trimethylol triacrylate, triallylamine, triarylcyanurate, triallylisocyanate, polyethyleneglycol, diethyleneglycol, and propyleneglycol may be used.

Such internal crosslinking agent may be included in an amount of about 0.01% by weight to about 0.5% by weight, based on the total weight of the monomer composition, and it may crosslink the prepared polymer.

In the preparation method of the present invention, the monomer composition of the superabsorbent polymer may further include additives such as a thickener, a plasticizer, a storage stabilizer, an antioxidant, etc., if necessary.

The monomer composition may be prepared in the form of a solution of the monomer composition, in which the raw materials such as the water-soluble ethylene-based unsaturated monomer, the photo-polymerization initiator, the thermal polymerization initiator, the internal crosslinking agent, and the additives are dissolved in a solvent.

In this regard, any solvent may be used without limitation in the constitution, as long as it is able to dissolve the above components, and for example, one or more solvents selected from the group consisting of water, ethanol, ethylene glycol, diethylene glycol, triethylene glycol, 1,4-butanediol, propylene glycol, ethylene glycol monobutylether, propylene glycol monomethylether, propylene glycol monomethylether acetate, methylethylketone, acetone, methylamylketone, cyclohexanone, cyclopentanone, diethylene glycol monomethylether, diethyleneglycol ethylether, toluene, xylene, butylolactone, carbitol, methylcellosolve acetate, and N,N-dimethyl acetamide, etc. may be used in combination.

The solvent may be included in the monomer composition in a residual quantity excluding the above-described components.

Meanwhile, the method of preparing the water-containing gel polymer by thermal polymerization or photo-polymerization of the monomer composition is not particularly limited, as long as it is a polymerization method commonly used.

Specifically, the polymerization method is largely classified into the thermal polymerization and the photo-polymerization according to a polymerization energy source. The thermal polymerization may be carried out in a reactor like a kneader equipped with agitating spindles and the photo-polymerization may be carried out in a reactor equipped with a movable conveyor belt. The above-described polymerization method is an example only, and the present disclosure is not limited to the above-described polymerization method.

For example, as described above, thermal polymerization is performed by providing hot air to a reactor like a kneader equipped with the agitating spindles or by heating the reactor to obtain the water-containing gel polymer. At this time, the water-containing gel polymer thus obtained may have a size of centimeters to millimeters when it is discharged from the outlet of the reactor, according to the type of agitating spindles equipped in the reactor. Specifically, the water-containing gel polymer may be obtained in various forms according to the concentration of the monomer composition fed thereto, the feeding speed, or the like. Generally, the water-containing gel polymer having a weight average particle size of 2 mm to 50 mm may be obtained.

Further, as described above, when photo-polymerization is carried out in a reactor equipped with a movable conveyor belt, the water-containing gel polymer commonly obtained may be a water-containing gel polymer in a sheet-type having a width of the belt. In this regard, the thickness of the polymer sheet may vary according to the concentration of the monomer composition fed thereto and the feeding speed, and the feeding speed of the monomer composition is preferably controlled so that the polymer sheet having a thickness of about 0.5 cm to about 5 cm is obtained. If the monomer composition is fed so that the thickness of the sheet-type polymer becomes too thin, the production efficiency becomes low, which is not preferred. If the thickness of the sheet-type polymer exceeds 5 cm, the polymerization reaction may not uniformly occur throughout the polymer due to the excessively high thickness.

In this regard, the water-containing gel polymer thus obtained by the method may have generally a water content of about 40% by weight to about 80% by weight. Meanwhile, the term "water content", as used herein, means a water content in the total weight of the water-containing gel polymer, which is obtained by subtracting the weight of the dry polymer from the weight of the water-containing gel polymer. Specifically, the water content is defined as a value calculated by measuring the weight loss according to evaporation of water in the polymer during the drying process of increasing the temperature of the polymer with infrared heating. In this regard, the water content is measured under the drying conditions which are determined as follows; the temperature is increased from room temperature to about 180° C. and then the temperature is maintained at 180° C., and the total drying time is determined as 20 minutes, including 5 minutes for the temperature rising step.

Next, the obtained water-containing gel polymer is dried.

In this regard, a coarse pulverization process may be further carried out before drying in order to increase the efficiency of the drying process, if necessary.

There is no limitation in the constitution of a milling machine to be used. Specifically, any one device selected from the group consisting of a vertical pulverizer, a turbo cutter, a turbo grinder, a rotary cutter mill, a cutter mill, a disc mill, a shred crusher, a crusher, a chopper, and a disc cutter may be used, but it is not limited thereto.

The pulverization may be carried out so that the particle size of the water-containing gel polymer is about 2 mm to about 10 mm.

Due to the high water content, it is technically not easy to pulverize the water-containing gel polymer to a particle size of less than 2 mm, and the pulverized particles may agglomerate together. Meanwhile, when the particle size is larger than 10 mm, the effect of increasing the efficiency of the subsequent drying process may be unsatisfactory.

The water-containing gel polymer pulverized or the water-containing gel polymer not pulverized immediately after the polymerization is subjected to drying. In this regard, the drying temperature of the drying process may be about 150° C. to about 250° C. When the drying temperature is lower than 150° C., there is a concern about excessively long drying time or deterioration of the physical properties of the superabsorbent polymer finally formed, and when the drying temperature is higher than 250° C., only the surface of the polymer is dried, and thus there is a concern about generation of fine powder during the subsequent pulverization process and deterioration of the physical properties of the superabsorbent polymer finally formed. Therefore, the drying process may be preferably performed at a temperature of about 150° C. to about 200° C., and more preferably about 160° C. to about 180° C.

Meanwhile, the drying process may be carried out for about 20 minutes to about 90 minutes, considering the process efficiency, but is not limited thereto.

Furthermore, any drying method may be selected and used in the drying process without limitation in the constitution, as long as it may be commonly used for drying the water-containing gel polymer. Specifically, the drying step may be carried out by a method of supplying hot air, irradiating infrared rays, irradiating microwaves, irradiating ultraviolet rays, etc. When the drying process as above is finished, the water content of the polymer may be about 0.1% by weight to about 10% by weight.

Next, the dried polymer obtained from the drying process is subjected to pulverization.

The polymer powder obtained after pulverization may have a particle size of about 150 μm to about 850 μm. Specific example of a milling machine used to pulverize the polymer into a particle size within the above range may include a pin mill, a hammer mill, a screw mill, a roll mill, a disc mill, a jog mill, etc., but the present disclosure is not limited to the above-described examples.

To manage the physical properties of the superabsorbent polymer powder finally manufactured after pulverization, the polymer powder obtained after pulverization may be subjected to an additional process of classifying the polymer powder according to the particle size. Polymers having a particle size of about 150 μm to about 850 μm are preferably classified.

According to an embodiment of the present invention, the pulverized or classified polymer may be further subjected to surface-crosslinking.

The surface crosslinking is a process of increasing the crosslinking density in the vicinity of the surface of the superabsorbent polymer particle with regard to the internal crosslinking density of particles. In general, the surface crosslinking agent is applied to the surface of the superabsorbent polymer particle. Therefore, this reaction occurs on the surface of the superabsorbent polymer particle, which improves crosslinking on the surface of the particle without substantially affecting the interior of the particle. Thus, the surface-crosslinked superabsorbent polymer particles have a higher level of crosslinking in the vicinity of the surface than in the interior.

In this regard, a compound reactable with the functional groups of the polymer may be used as the surface crosslinking agent without limitations in the constitution.

To improve the properties of the produced superabsorbent polymer, one or more selected from the group consisting of a polyhydric alcohol compound; an epoxy compound; a polyamine compound; a haloepoxy compound; a condensation product of the haloepoxy compound; an oxazoline compound; a mono-, di-, or polyoxazolidinone compound; a cyclic urea compound; a polyvalent metal salt; and an alkylene carbonate compound may be used as the surface crosslinking agent.

Specific examples of the polyhydric alcohol compound may include one or more selected from the group consisting of a mono-, di-, tri-, tetra-, or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy compound may be ethylene glycol diglycidyl ether, glycidol, etc., and the polyamine compound may be one or more selected from the group consisting of ethylene diamine, diethylene triamine, triethylene tetraamine, tetraethylene pentamine, pentaethylene hexamine, polyethylene imine, and polyamide polyamine.

Further, the haloepoxy compound may be epichlorohydrin, epibromohydrin, or α-methylephichlorohydrin. Meanwhile, the mono-, di-, or polyoxazolidinone compound may be, for example, 2-oxazolidinone, etc.

Further, the alkylene carbonate compound may be ethylene carbonate, etc. These compounds may be used alone or in combination. On the other hand, to increase the efficiency of the surface crosslinking process, one or more of polyhydric alcohols may be preferably included in these surface crosslinking agents. More preferably, polyhydric alcohol compounds having 2 to 10 carbon atoms may be used.

The amount of the surface crosslinking agent added may be appropriately selected according to the kind of the surface crosslinking agent or the reaction conditions, and generally, the amount may be about 0.001 to about 5 parts by weight, preferably about 0.01 to about 3 parts by weight, and more preferably about 0.05 to about 2 parts by weight, based on 100 parts by weight of the polymer.

When the amount of the surface crosslinking agent is too small, the surface crosslinking reaction may not occur practically, and when the amount exceeds 5 parts by weight, based on 100 parts by weight of the polymer, the water holding capacity and the properties may be decreased due to excessive surface crosslinking reaction.

The surface crosslinking reaction and drying may be carried out at the same time by heating the polymer particles to which the surface crosslinking agent is added.

A means for raising the temperature for surface crosslinking reaction is not particularly limited. Heating may be performed by providing a heating medium or by directly providing a heat source. In this regard, the type of the heating medium applicable may be a hot fluid such as steam, hot air, hot oil, etc. However, the present disclosure is not limited thereto. The temperature of the heating medium provided may be appropriately selected, considering the means of the heating medium, the heating rate, and the target temperature. Meanwhile, as the heat source provided directly, an electric heater or a gas heater may be used, but the present disclosure is not limited to these examples.

Polymer particles having a low particle size may be generated during the respective processes of the polymerization, coarse pulverization, drying, pulverization, classification, and surface-crosslinking.

Polymers having a particular particle size, but not particularly limited to, for example, about 300 μm or less, may be classified as low particle size polymers. In particular, of the low particle size polymers, a polymer having a particle size of about 150 μm or less is called a fine particle. As such low particle size polymer has a smaller particle size, it has lower water absorption and a higher ratio of residual monomers. Therefore, when the low particle size polymer is included as it is in final superabsorbent polymer products, handling is difficult and it may cause deterioration of the physical properties such as a gel blocking phenomenon. Therefore, the low particle size polymers are preferably excluded so that they are not included in the final superabsorbent polymer products, or the low particle size polymers are preferably reused so that they have a normal particle size. In terms of productivity and economic aspect, the low particle size polymers are preferably reused rather than excluded. A process of reusing the low particle size polymers is performed by a reassembling process of aggregating the low particle size polymers with each other.

For example, to increase aggregation strength between the low particle size polymers during the reassembling process, the reassembling process is performed by mixing the low particle size polymers with water. In this regard, as the water content is higher, aggregation strength between the low particle size polymers increases. However, when the water content is above a certain level, aggregation does not occur. When the water content is low, aggregation strength is low, and thus aggregates may be often rebroken into low particle size polymers after reassembling.

According to the preparation method of the present invention, the low particle size polymer is mixed with a compound represented by the following Chemical Formula 1 and water, and the mixture is reassembled to prepare a reassembled polymer:

[Chemical Formula 1]

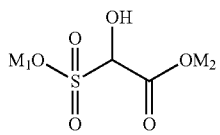

wherein $M_1$ and $M_2$ are the same as or different from each other, and each independently a monovalent cation. $M_1$ and $M_2$ may be each independently lithium (Li), sodium (Na), or potassium (K).

The compound of Chemical Formula 1 acts as a reducing agent. When the compound of Chemical Formula is mixed with the low particle size polymer and water, it reacts with the polymerization initiator remaining in the low particle size polymer to form a radical. The radical thus formed reacts with a monomer, that is, an unreacted ethylene-based unsaturated monomer included in the low particle size polymer. As a result, residual monomers are reduced.

According to an embodiment of the present disclosure, the compound of Chemical Formula 1 may be mixed in an amount of about 0.01 to about 1 part by weight, or about 0.01 to about 0.5 parts by weight, based on 100 parts by weight of the low particle size polymer. When the amount of the compound of Chemical Formula 1 is below the above range, the effect of reducing residual monomers hardly occurs. On the contrary, when the amount of the compound of Chemical Formula 1 exceeds the above range, the effect of improving the physical properties to be obtained is small, considering the amount of the compound used. Thus, it is economically undesirable.

The compound of Chemical Formula 1 may be exemplified by disodium hydroxy sulfoacetate, dipotassium hydroxy sulfoacetate, dilithium hydroxy sulfoacetate, etc.

According to an embodiment of the present disclosure, the low particle size polymers may be mixed after wetting them with water at a water content of about 30% to about 70%, preferably about 40% to about 60%.

To obtain the water content within the above range, water may be added in an amount of about 50 parts by weight to about 200 parts by weight, or about 75 parts by weight to about 150 parts by weight, based on 100 parts by weight of the low particle size polymer.

As the water content is increased during the reassembling process, aggregation strength increases, and penetration depth of the compound of Chemical Formula 1 into the low particle size polymers increases at the same time, which is advantageous in terms of reduction of residual monomers. However, when water is added at a high water content exceeding the above range, aggregation between low particle size polymers does not occur, that is, no granulation occurs, and polymers may exist separately. In this respect, water is preferably added within the above range.

After preparing the reassembled polymer, the reassembled polymer is further subjected to a drying process.

In this regard, a drying temperature of the drying process may be about 150° C. to about 250° C. When the drying temperature is lower than 150° C., there is a concern about excessively long drying time or deterioration of the physical properties of the superabsorbent polymer finally formed, and when the drying temperature is higher than 250° C., there is a concern about deterioration of the physical properties of the superabsorbent polymer finally formed, due to breaking of crosslinking network of the superabsorbent polymer. Further, thermal decomposition of the superabsorbent polymer occurs to cause odor such as smell of burning, etc. Therefore, the drying process may be preferably performed at a temperature of about 150° C. to about 200° C., and more preferably about 160° C. to about 190° C.

Meanwhile, the drying process may be carried out for about 20 to about 90 minutes, considering the process efficiency, but is not limited thereto.

When the drying process as above is finished, the water content of the polymer may be about 0.1% by weight to about 10% by weight.

According to an embodiment of the present invention, after drying the reassembled polymer, the reassembled polymer may be further subjected to pulverization or classification so that it has a particle size of about 150 µm to about 850 µm.

The reassembled polymer undergone reassembling, drying, pulverizing, and classifying processes according to the preparation method of the present disclosure may be used alone or mixed with a polymer having a particle size within a normal range, and then applied to products.

The reassembled polymer obtained according to the preparation method of the present disclosure may have a residual monomer content of about 350 ppm or less, about 200 ppm or less, or about 100 ppm or less, and thus it shows a very low monomer content.

Further, the reassembled polymer obtained according to the preparation method of the present disclosure may have a water holding capacity (CRC) of about 1.05 times to about 2.0 times, or about 1.1 times to about 1.5 times higher than that of the reassembled polymer obtained by reassembling only with water, as measured according to the EDANA method WSP 241.3.

Further, when the reassembled polymer obtained according to the preparation method of the present disclosure is exposed to severe conditions of a temperature of 50° C. or higher and a relative humidity of 80% or higher for 7 days or longer, more specifically, at a temperature of 50° C. to 90° C. and a relative humidity of 80% to 90% for 7 days to 10 days, and then its lightness is measured by HunterLab's color measurement instrument, a lightness difference ($\Delta L$) between the reassembled polymers before and after exposure to the severe conditions is about 20% or less. More specifically, when the reassembled polymer obtained according to the preparation method of the present disclosure is exposed to the severe conditions, its lightness difference ($\Delta L$) is, for example, about 0% to about 20%, about 0% to about 15%, or about 0% to about 10%, indicating a very low color change. Therefore, a high-quality superabsorbent polymer may be provided.

The present disclosure will be described in more detail with reference to the following Examples. However, the following Examples are provided for illustrative purposes only, and the present disclosure is not intended to be limited by the following Examples.

EXAMPLE

Example 1

100 g of acrylic acid monomer, 38.9 g of caustic soda (NaOH), and 103.9 g of water were mixed with each other, and to this mixture, 0.1 g of sodium persulfate as a thermal polymerization initiator, 0.01 g of diphenyl(2,4,6-trimethylbenzoyl)-phosphine oxide as a photopolymerization initiator, and 0.3 g of polyethylene glycol diacrylate as a crosslinking agent were added to prepare a monomer composition.

The monomer composition was irradiated with UV for 1 min in a reactor, in which the internal temperature of the reactor was maintained at 80° C. and a UV irradiator with a mercury UV lamp light source of 10 m\V was installed on the top of the reactor. Polymerization was further allowed under a light source-free condition for 2 min.

After completion of the polymerization, the sample was pulverized into particles of 10 mm or less using a milling machine, dried at a temperature of 180° C. for 40 min using a hot air dryer, and then re-pulverized using a rotary mixer, and classified using a particle size distribution measuring instrument.

To 100 g of a polymer having a particle size of 150 µm or less among the prepared polymers, a mixed solution of 125 g of ultrapure water and 0.148 g of disodium hydroxy sulfoacetate was added, and then mixed at 650 RPM for 1 min for reassembling. After completion of the reassembling process, the resulting polymer was dried at a temperature of 190° C. for 2 hrs, and pulverized using a hammer mill. The pulverized polymer particles were classified into a particle size of 150 µm~850 µm.

Example 2

A polymer was prepared in the same manner as in Example 1, except that the reassembling process was carried out by adding a mixed solution of 125 g of ultrapure water and 0.074 g of disodium hydroxy sulfoacetate to 100 g of the polymer having a particle size of 150 µm or less among the prepared polymers.

Example 3

A polymer was prepared in the same manner as in Example 1, except that the reassembling process was carried out by adding a mixed solution of 125 g of ultrapure water and 0.037 g of disodium hydroxy sulfoacetate to 100 g of the polymer having a particle size of 150 µm or less among the prepared polymers.

Example 4

A polymer was prepared in the same manner as in Example 1, except that the reassembling process was carried out by adding a mixed solution of 125 g of ultrapure water and 0.296 g of disodium hydroxy sulfoacetate to 100 g of the polymer having a particle size of 150 µm or less among the prepared polymers.

Example 5

A polymer was prepared in the same manner as in Example 1, except that the reassembling process was carried out by adding a mixed solution of 100 g of ultrapure water and 0.074 g of disodium hydroxy sulfoacetate to 100 g of the polymer having a particle size of 150 µm or less among the prepared polymers.

Example 6

A polymer was prepared in the same manner as in Example 1, except that the reassembling process was carried out by adding a mixed solution of 150 g of ultrapure water and 0.074 g of disodium hydroxy sulfoacetate to 100 g of the polymer having a particle size of 150 µm or less among the prepared polymers.

Example 7

A polymer was prepared in the same manner as in Example 1, except that the reassembling process was carried out by adding 100 g of a polymer having a particle size of 300 µm or less among the prepared polymers.

Comparative Example 1

A polymer was prepared in the same manner as in Example 1, except that the reassembling process was carried out by adding only 125 g of ultrapure water to 100 g of the polymer having a particle size of 150 µm or less among the prepared polymers.

Comparative Example 2

A polymer was prepared in the same manner as in Example 1, except that the reassembling process was carried out by adding a mixed solution of 125 g of ultrapure water and 0.070 g of sodium sulfite to 100 g of the polymer having a particle size of 150 μm or less among the prepared polymers.

Comparative Example 3

A polymer was prepared in the same manner as in Example 1, except that the reassembling process was carried out by adding only 125 g of ultrapure water to 100 g of the polymer having a particle size of 300 μm or less among the prepared polymers.

The reassembling process conditions of Examples 1 to 7 and Comparative Examples 1 to 3 are summarized in the following Table 1.

TABLE 1

| | Particle size of polymer to be reassembled | Content of polymer to be reassembled | Content of ultrapure water | Addition compound and content |
|---|---|---|---|---|
| Example 1 | 150 μm or less | 100 g | 125 g | Chemical Formula 1, 0.148 g |
| Example 2 | 150 μm or less | 100 g | 125 g | Chemical Formula 1, 0.074 g |
| Example 3 | 150 μm or less | 100 g | 125 g | Chemical Formula 1, 0.037 g |
| Example 4 | 150 μm or less | 100 g | 125 g | Chemical Formula 1, 0.296 g |
| Example 5 | 150 μm or less | 100 g | 100 g | Chemical Formula 1, 0.074 g |
| Example 6 | 150 μm or less | 100 g | 150 g | Chemical Formula 1, 0.074 g |
| Example 7 | 300 μm or less | 100 g | 125 g | Chemical Formula 1, 0.148 g |
| Comparative Example 1 | 150 μm or less | 100 g | 125 g | — |
| Comparative Example 2 | 150 μm or less | 100 g | 125 g | Sodium sulfite, 0.070 g |
| Comparative Example 3 | 300 μm or less | 100 g | 125 g | — |

Experimental Example

With respect to the superabsorbent polymers of Examples 1 to 7 and Comparative Examples 1 to 3, residual monomers, water holding capacity (CRC), initial lightness ($L_0$), lightness (L) after exposure to severe conditions, and a lightness difference (ΔL) were measured by the following methods, and shown in the following Table 2.

Measurement of Residual Monomer Content

The content of residual monomers was measured in accordance with the EDANA method WSP 210.3. Each 1 g of the polymers of Examples and Comparative Examples was stirred in 200 mL of 0.9 parts by weight of a brine solution in a beaker containing a 2.5 cm spin bar to extract unreacted acrylic acid. The extracted solution was analyzed by LC (liquid chromatography) to quantify the amount of residual acrylic acid.

Measurement of Water Holding Capacity (CRC)

Water holding capacity was measured in accordance with the EDANA method WSP 241.3. Each 0.2 g of the polymers of Examples and Comparative Examples was put in a tea bag, and the tea bag was sealed, and soaked in a 0.9% brine solution for 30 min. Then, water was removed therefrom in a centrifuge at 250 G for 3 min, followed by weighing. The amount of the brine solution held by the polymer was measured to determine water holding capacity.

Measurement of Lightness (L)

A color change under severe conditions was determined by L value which represents lightness on the Hunter Lab color space. L value ranges from 0 (black) to 100 (white). Each 5.0 g of the polymers of Examples and Comparative Examples was evenly spread on a Petri dish, and left under severe conditions (temperature of 70° C., relative humidity of 90%) for 10 days. Then, lightness (L) was determined using a Hunter Lab color measurement instrument. Further, a lightness difference (ΔL) with respect to the initial lightness ($L_0$) before exposure to the severe conditions was calculated by the following Equation 1.

$$\text{Lightness difference}(\Delta L, \text{unit: \%}) = (L_0 - L)/L_0 * 100 \quad \text{[Equation 1]}$$

TABLE 2

| | Content of residual monomer (unit: ppm) | Water holding capacity (unit: g/g) | Initial lightness ($L_0$) | Lightness after 10 days (L) | Lightness difference (ΔL) (unit: %) |
|---|---|---|---|---|---|
| Example 1 | 181 | 36.6 | 86.54 | 81.44 | 6.0 |
| Example 2 | 284 | 37.0 | 88.01 | 79.28 | 9.9 |
| Example 3 | 330 | 37.8 | 87.64 | 76.45 | 12.8 |
| Example 4 | 80 | 37.9 | 87.85 | 81.43 | 7.3 |
| Example 5 | 198 | 36.4 | 88.18 | 78.68 | 10.8 |
| Example 6 | 147 | 36.2 | 87.45 | 78.42 | 10.3 |
| Example 7 | 136 | 40.9 | 86.97 | 80.20 | 7.8 |
| Comparative Example 1 | 355 | 33.8 | 86.09 | 62.73 | 27.1 |
| Comparative Example 2 | 190 | 37.0 | 87.46 | 68.42 | 21.8 |
| Comparative Example 3 | 334 | 35.2 | 87.95 | 65.91 | 25.1 |

Referring to Table 2, owing to action of the compound of Chemical Formula 1, the reassembled polymers obtained according to the preparation method of the present disclosure show a reduced content of residual monomer, high water holding capacity, and low color change, and therefore, it is expected to provide a high-quality superabsorbent polymer.

What is claimed is:

1. A method of preparing a superabsorbent polymer, the method comprising:
   preparing a reassembled polymer by reassembling a mixture of a polymer resulting from polymerization of an ethylene-based unsaturated monomer, a compound represented by the following Chemical Formula 1, and water;
   drying the reassembled polymer; and
   pulverizing the dried reassembled polymer:

[Chemical Formula 1]

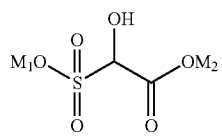

wherein $M_1$ and $M_2$ are the same as or different from each other, and each independently a monovalent cation,
   wherein the superabsorbent polymer has a water holding capacity (CRC) of 1.05 times to 2.0 times higher than that of a reassembled polymer obtained by reassembling only with water.

2. The method of claim 1, wherein an amount of water is 50 parts by weight to 200 parts by weight, based on 100 parts by weight of the polymer.

3. The method of claim 1, wherein the compound represented by Chemical Formula 1 is disodium hydroxy sulfoacetate.

4. The method of claim 1, further comprising surface-crosslinking the pulverized reassembled polymer.

5. The method of claim 1, wherein the polymer resulting from polymerization of the ethylene-based unsaturated monomer is one or more selected from the group consisting of a water-containing gel polymer obtained by thermal polymerization or photo-polymerization of a monomer composition comprising water-soluble ethylene-based unsaturated monomers and a polymerization initiator, a polymer obtained by drying the water-containing gel polymer, a polymer obtained by pulverizing the water-containing gel polymer or the dried polymer, a polymer before performing a surface crosslinking reaction, and a polymer after performing the surface crosslinking reaction.

6. The method of claim 1, wherein the polymer resulting from polymerization of the ethylene-based unsaturated monomer has a particle size of 300 µm or less.

7. The method of claim 1, wherein a content of unreacted ethylene-based unsaturated monomer in the superabsorbent polymer is 350 ppm or less.

8. The method of claim 1, wherein the superabsorbent polymer has a lightness difference (ΔL) of 20% or less, as calculated by the following Equation 1:

$$\text{Lightness difference }(\Delta L, \text{unit: }\%)=(L_0-L)/L_0*100 \quad [\text{Equation 1}]$$

wherein $L_0$ is an initial lightness of the superabsorbent polymer, measured by a Hunter Lab color measurement instrument, and L is a lightness of the superabsorbent polymer after being exposed to a temperature of 50° C. or higher and a relative humidity of 80% or higher for 7 days or longer, measured by a Hunter Lab color measurement instrument.

9. The method of claim 1, wherein the ethylene-based unsaturated monomer is one or more selected from the group consisting of an anionic monomer and salts thereof, a nonionic hydrophilic monomer, an amino group-containing unsaturated monomer, and a quaternary compound thereof.

10. The method of claim 1, wherein the ethylene-based unsaturated monomer is one or more selected from the group consisting of acrylic acid and salts thereof, (meth)acrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, 2-(meth)acrylamide-2-methyl propane sulfonic acid, (meth)acrylamide, N-substituted (meth)acrylate, 2-hydroxyethyl (meth)acrylate, 2-hydroxypropyl(meth)acrylate, methoxy polyethylene glycol (meth)acrylate, polyethylene glycol (meth)acrylate, (N,N)-dimethylaminoethyl(meth)acrylate, (N,N)-dimethylaminopropyl(meth)acrylamide, and a quaternary compound thereof.

* * * * *